US008560850B2

(12) United States Patent
Li

(10) Patent No.: US 8,560,850 B2
(45) Date of Patent: Oct. 15, 2013

(54) ESTABLISHMENT METHOD AND DEVICE FOR LINK BETWEEN ACCESS POINT AND REPEATER IN WIRELESS DISTRIBUTION SYSTEM

(75) Inventor: Yan Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 24 days.

(21) Appl. No.: 13/140,715

(22) PCT Filed: Dec. 24, 2009

(86) PCT No.: PCT/CN2009/076005
§ 371 (c)(1),
(2), (4) Date: Jun. 17, 2011

(87) PCT Pub. No.: WO2011/000195
PCT Pub. Date: Jan. 6, 2011

(65) Prior Publication Data
US 2012/0089834 A1    Apr. 12, 2012

(30) Foreign Application Priority Data

Jul. 3, 2009 (CN) .......................... 2009 1 0151596

(51) Int. Cl.
*H04L 9/32* (2006.01)
(52) U.S. Cl.
USPC ............................................ 713/168; 726/12
(58) Field of Classification Search
USPC .............................................................. 713/168
See application file for complete search history.

(56) References Cited

U.S. PATENT DOCUMENTS

| 7,697,932 | B2 * | 4/2010 | Nakajima ................. 455/435.1 |
| 7,746,804 | B1 * | 6/2010 | Shurmantine et al. ........ 370/252 |
| 7,761,050 | B2 * | 7/2010 | Fitton et al. ...................... 455/7 |
| 2007/0008889 | A1 | 1/2007 | Seo |

FOREIGN PATENT DOCUMENTS

| CN | 1983968 A | 6/2007 |
| CN | 101257705 A | 9/2008 |
| CN | 101287268 A | 10/2008 |
| CN | 101605330 A | 12/2009 |

* cited by examiner

*Primary Examiner* — Kambiz Zand
*Assistant Examiner* — Gita Faramarzi
(74) *Attorney, Agent, or Firm* — McGarry Bair PC

(57) ABSTRACT

The present invention provides an establishment method and device for a link between an access point and a repeater in a wireless distribution system. The method comprises: starting the access point and the repeater in the wireless distribution system; the access point and the repeater transmitting an interactive message to each other, and obtaining channel information, channel encryption mode, cipher key information, and address information of an opposite end about the link between the access point and the repeater from the interactive message; the access point and the repeater establishing the link between the access point and the repeater according to the channel information, the channel encryption mode, the cipher key information, and the address information of the opposite end. The device comprises: a starting module, an interactive module, and an establishment module. The present invention overcomes the problem of the establishment method for a link between the access point and the repeater in a wireless distribution system, that is, it needs a user's manual input to determine the channel of the WDS link establishment, which causes the procedure of the link establishment is relatively troublesome. Furthermore, the present invention achieves the automatic optimal configurations on the channel of the WDS link, such that the operation of the user is more convenient and quicker, and the quality and the rate of the link are increased.

23 Claims, 5 Drawing Sheets

ESTABLISHMENT METHOD AND DEVICE FOR LINK BETWEEN ACCESS POINT AND REPEATER IN WIRELESS DISTRIBUTION SYSTEM

CROSS-REFERENCE TO RELATED APPLICATIONS

This application is a National Phase application of International Application No. PCT/CN2009/076005, filed Dec. 24, 2009, which claims the benefit of Chinese Patent Application No. 200910151596.4, filed Jul. 3, 2009, both of which are incorporated herein by reference in their entirety.

FIELD OF THE INVENTION

The present invention relates to wireless communication field, in particular to an establishment method and an establishment device for a link between an access point and a repeater in a wireless distribution system.

BACKGROUND OF THE INVENTION

With the development of wireless technology, wireless network is increasingly popularized in the daily life of human being. It is out of question that wireless transmission distance is one of the focuses that people pay attention. A Wireless Distribution System (WDS) in wireless local area network is used for further extending the wireless transmission distance.

FIG. 1 illustrates a structural schematic view of a typical WDS system, wherein the WDS system mainly comprises two parts, a Wireless Distribution System-Access Point (WDS-AP) and a Wireless Distribution System-Repeater (WDS-Repeater). Referring to FIG. 1, the WDS-AP, as a wireless access point, is connected to the internet, and a wireless site can be directly wirelessly accessed to the WDS-AP (as the wireless site 1 shown in FIG. 1). After a wireless link is established between the WDS-Repeater and the WDS-AP, the wireless site can also be wirelessly accessed to the WDS-AP via the WDS-Repeater (as the wireless site 2 shown in FIG. 1). Since the WDS-Repeater can forward wireless data between the WDS-AP and the wireless site, the extension of the wireless transmission distance can be realized.

In the related art, an establishment method for a link between an access point and a repeater in the wireless distribution system is provided, in which a user manually configures link parameters. such as the WDS link channel, mac address, channel encryption mode (also referred to as encryption mode hereinafter), cipher key and so on.

During implementing the present invention, the present inventor found that in the establishment method for a link between an access point and a repeater in the wireless distribution system of the related art, it needs a user's manual input to determine the link parameters of the WDS link establishment, such as channel, mac address, channel encryption mode, cipher key and so on, which causes the procedure of the link establishment is relatively troublesome.

SUMMARY OF THE INVENTION

The present invention aims at providing an establishment method for a link between an access point and a repeater in a wireless distribution system, which can overcome the problem of the related art that the establishment method for a link applied in the wireless distribution system needs a user's manual input so as to determine the link parameters of the WDS link establishment, such as channel, mac address, channel encryption mode, cipher key and so on, which causes the procedure of the link establishment is relatively troublesome.

In an embodiment of the present invention, it provides an establishment method for a link between an access point and a repeater in a wireless distribution system, comprising the steps: starting the access point and the repeater in the wireless distribution system; the access point and the repeater transmitting an interactive message to each other, and obtaining channel information, channel encryption mode, cipher key information, and address information of an opposite end about the link between the access point and the repeater from the interactive message; the access point and the repeater establishing the link between the access point and the repeater according to the channel information, the channel encryption mode, the cipher key information, and the address information of the opposite end.

Preferably, in the above establishment method, the step of starting the access point and the repeater in the wireless distribution system comprises: pressing down a wireless distribution system peer key of the access point and the repeater.

Preferably, in the above establishment method, the step of the access point and the repeater establishing the link between the access point and the repeater according to the channel information, the channel encryption mode, the cipher key information, and the address information of the opposite end comprises: the access point storing the address information of the repeater; the repeater performing a self-configuration according to the channel information, the encryption mode, the cipher key information and the address information of the access point, and the link of the wireless distribution system being successfully established.

Preferably, in the above establishment method, the step of the access point and the repeater transmitting the interactive message to each other, and obtaining the channel information about the link between the access point and the repeater from the interactive message comprises: the repeater transmitting an exploration broadcast message, wherein the exploration broadcast message comprises capability information of the repeater; and the access point transmitting an exploration response message if the access point receives the exploration broadcast message within a first allowed time, wherein the exploration response message comprises the channel information.

Preferably, in the above establishment method, the step of the access point and the repeater transmitting the interactive message to each other, and obtaining the encryption mode and the cipher key information from the interactive message comprises: the repeater transmitting a link request message to the access point by using the channel; the access point comparing the number of wireless distribution system links which have been established with a maximum value of allowable links if the access point receives the link request message within the first allowed time; if the number of the wireless distribution system links which have been established is less than the maximum value of the allowable links, the access point transmitting a link success message, wherein the link success message comprises the encryption mode and the cipher key information; the repeater receiving the link success message and transmitting an authentication request message according to the encryption information; the access point performing authentication on the repeater if the access point receives the authentication request message within a second allowed time; and if the authentication is successful, the access point transmitting an authentication success message.

Preferably, in the above establishment method, the step of the access point and the repeater transmitting the interactive message to each other, and obtaining the address information of the opposite end from the interactive message comprises: the repeater receiving the authentication success message and transmitting an add request message, wherein the add request message comprises the address information of the repeater; and the access point transmitting an add success message if the access point receives the add request message within a third allowed time, wherein the add request message comprises the address information of the access point.

Preferably, in the above establishment method, the step of the access point and the repeater transmitting the interactive message to each other, and obtaining the channel information, the channel encryption mode, the cipher key information, and the address information of the opposite end about the link between the access point and the repeater from the interactive message comprises: the access point transmitting an add failing message if the access point does not receive the add request message within the third allowed time; detecting whether the first allowed time expires; and according to a detection result, the repeater and the access point re-obtaining the channel information, the channel encryption mode, the cipher key information, and the address information of the opposite end about the link between the access point and the repeater.

Preferably, in the above establishment method, the step of the access point and the repeater transmitting the interactive message to each other, and obtaining the channel information, the channel encryption mode, the cipher key information, and the address information of the opposite end about the link between the access point and the repeater from the interactive message comprises: if the authentication is failed, the access point transmitting an authentication failing message; detecting whether the first allowed time expires; and according to a detection result, the repeater and the access point re-obtaining the channel information, the channel encryption mode, the cipher key information, and the address information of the opposite end about the link between the access point and the repeater.

Preferably, in the above establishment method, the step of the access point and the repeater transmitting the interactive message to each other, and obtaining the channel information, the channel encryption mode, the cipher key information, and the address information of the opposite end about the link between the access point and the repeater from the interactive message comprises: the access point detecting whether the first allowed time expires if the access point does not receive the authentication request message within the second allowed time; and according to a detection result, the repeater and the access point re-obtaining the channel information, the channel encryption mode, the cipher key information, and the address information of the opposite end about the link between the access point and the repeater.

Preferably, in the above establishment method, the step of the repeater and the access point obtaining the channel information, the channel encryption mode, the cipher key information, and the address information of the opposite end about the link between the access point and the repeater according to a detection result comprises: if the number of the wireless distribution system links which have been established is not less than the maximum value of the allowable links, the access point transmitting a link failing message; detecting whether the first allowed time expires; and according to a detection result, the repeater and the access point re-obtaining the channel information, the channel encryption mode, the cipher key information, and the address information of the opposite end about the link between the access point and the repeater.

Preferably, in the above establishment method, the step of the repeater and the access point re-obtaining the channel information, the channel encryption mode, the cipher key information, and address information of the opposite end about the link between the access point and the repeater according to the detection result comprises: if the first allowed time does not expire, the access point and the repeater re-transmitting the interactive message to each other, and re-obtaining the channel information, the channel encryption mode, the cipher key information, and the address information of the opposite end about the link between the access point and the repeater from the interactive message.

Preferably, in the above establishment method, the step of the repeater and the access point re-obtaining the channel information, the channel encryption mode, the cipher key information, and the address information of the opposite end about the link between the access point and the repeater according to the detection result comprises: if the first allowed time expires, waiting for a restart of the access point and the repeater; the access point and the repeater, after restarting, transmitting the interactive message to each other and obtaining the channel information, the channel encryption mode, the cipher key information, and the address information of the opposite end about the link between the access point and the repeater from the interactive message.

Preferably, in the above establishment method, the step of the access point and the repeater transmitting the interactive message to each other and obtaining the channel information, the channel encryption mode, the cipher key information, and the address information of the opposite end about the link between the access point and the repeater from the interactive message comprises: the access point waiting for a restart of the access point and the repeater if the access point does not receive the link request message within the first allowed time; and the access point and the repeater, after restarting, transmitting the interactive message to each other and re-obtaining the channel information, the channel encryption mode, the cipher key information, and the address information of the opposite end about the link between the access point and the repeater from the interactive message.

Preferably, in the above establishment method, the step of the access point and the repeater transmitting the interactive message to each other and obtaining the channel information, the channel encryption mode, the cipher key information, and the address information of the opposite end about the link between the access point and the repeater from the interactive message comprises: the access point waiting for a restart of the access point and the repeater if the access point does not receive the exploration broadcast message within the first allowed time; and the access point and the repeater, after restarting, transmitting the interactive message to each other and re-obtaining the channel information, the channel encryption mode, the cipher key information, and the address information of the opposite end about the link between the access point and the repeater from the interactive message.

According to anther aspect, in the embodiment of the present invention, it provides an establishment device for a link between an access point and a repeater in a wireless distribution system, comprising: a starting module, configured to start the access point and the repeater in the wireless distribution system; an interactive module, configured to transmit an interactive message mutually and obtain channel information, channel encryption mode, cipher key information, and address information of an opposite end about the link between the access point and the repeater from the interactive message; and an establishment module, configured to establish the link between the access point and the repeater according to the channel information, the encryption mode, the cipher key information, and the address information of the opposite end.

According to anther aspect, in the embodiment of the present invention, it provides an establishment device for a link between an access point and a repeater in a wireless distribution system, wherein the access point in the wireless distribution system comprises a wireless distribution system peer key The establishment device comprises a starting module, configured to start the access point by pressing down the wireless distribution system peer key, and start the repeater in the wireless distribution system; an interactive module, configured to transmit an interactive message mutually and obtain channel information, channel encryption mode, cipher key information, and address information of an opposite end about the link between the access point and the repeater from the interactive message; and an establishment module, configured to establish the link between the access point and the repeater according to the channel information, the encryption mode, the cipher key information, and the address information of the opposite end.

According to anther aspect, in the embodiment of the present invention, it provides a device for establishing link between an access point and a repeater in a wireless distribution system, wherein the repeater of the wireless distribution system comprises a wireless distribution system peer key. The establishment device comprises a starting module, configured to start the repeater by pressing down the wireless distribution system peer key, and start the access point in the wireless distribution system; an interactive module, configured to transmit an interactive message mutually and obtain channel information, channel encryption mode, cipher key information, and address information of an opposite end about the link between the access point and the repeater from the interactive message; and an establishment module, configured to establish the link between the access point and the repeater according to the channel information, the encryption mode, the cipher key information, and the address information of the opposite end.

In the above embodiments, a user merely needs to start the access point and the repeater in the wireless distribution system, such that the repeater automatically scans the channel to obtain the channel and then establishes the link between the access point and the repeater by using the channel, which therefore overcomes the problem of the establishment method for a link between the access point and the repeater in a wireless distribution system in the related art, that is, it needs a user's manual input to determine the link parameters of the WDS link establishment, such as channel, mac address, channel encryption mode, cipher key and so on, which causes the procedure of the link establishment is relatively troublesome. Furthermore, the above embodiments achieve the automatic optimal configurations on the link parameters, such as the WDS link channel, mac address, the channel encryption mode, the cipher key and so on, such that the user can operate more conveniently and quickly, and the quality and the rate of the link are increased.

BRIEF DESCRIPTION OF THE DRAWINGS

The drawings described herein provide a further understanding of the present invention and constitute a part of the application. The exemplary embodiments of the present invention and the explanation thereof are given for explaining the present invention, and thus shall not be construed as improper limitations on the present invention, wherein.

DETAILED DESCRIPTION OF EMBODIMENTS

Hereinafter, the present invention is described in detail referring to the Figures and in conjunction with the embodiments.

Figure 1:
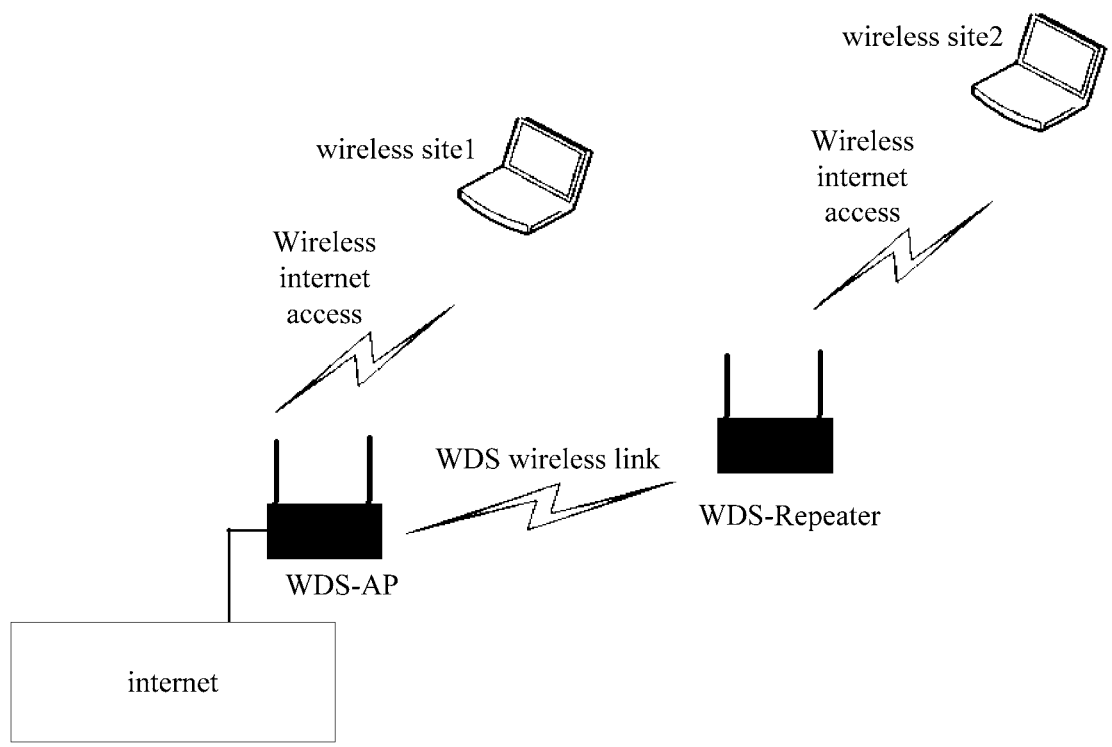
FIG. 1 is a structure schematic view of a typical WDS system.
Figure 2:
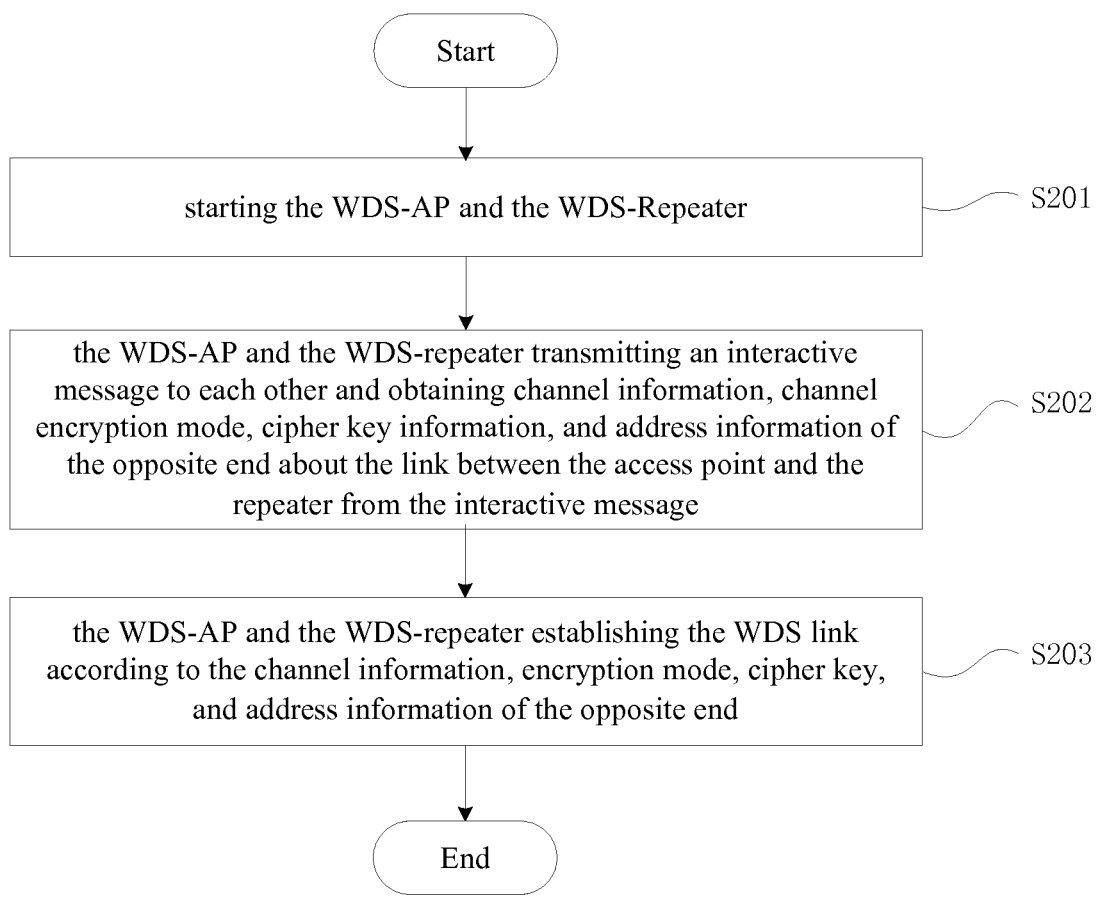
FIG. 2 is a flow chart of the establishment method according to one embodiment of the present invention.

FIG. 2 is a flow chart of the establishment method according to one embodiment of the present invention. The method comprises the following steps:

step S201, a WDS-AP and a WDS-Repeater are started;

step S202, the WDS-AP and the WDS-repeater transmit an interactive message to each other and obtain channel information, channel encryption mode, cipher key information, and address information of an opposite end about the link between the access point and the repeater from the interactive message;

step S203, the WDS-AP and the WDS-repeater establish a WDS link according to the channel information, the encryption mode, the cipher key information, and the address information of the opposite end.

In the present embodiment, the user merely needs to start the WDS-AP and the WDS-repeater, such that the WDS-AP and the WDS-repeater can automatically transmit an interactive message to each other, obtain the channel information, the channel encryption mode, the cipher key information, and the address information of the opposite end about the link between the access point and the repeater from the interactive message, and then establish the WDS link according to the channel information, the encryption mode, the cipher key information, and the address information of the opposite end, which therefore overcomes the problem of the establishment method for a WDS link in the related art, that is, it needs the user's manual input to determine the link parameters of the WDS link establishment, such as channel, mac address, channel encryption mode, cipher key and so on, which causes the procedure of the link establishment is relatively troublesome. Furthermore, the present invention achieves the automatic optimal configurations on the link parameters such as the WDS link channel, mac address, the channel encryption mode, the cipher key and so on, such that the user can operate more conveniently and quickly, and the quality and the rate of the link are increased.

Preferably, in the above establishment method, the step S201 specifically comprises: a wireless distribution system peer (wdspeer) key of the WDS-AP and the WDS-repeater is pressed down.

In the present embodiment, the wdspeer key is pressed down so as to start the WDS-AP and the WDS-Repeater. Each of the WDS-AP and the WDS-Repeater is configured with a wdspeer key. The user merely needs to press down the wdspeer key on the WDS-AP side and the WDS-Repeater side to start the WDS-AP and the WDS-Repeater, thus the operation is simple.

Preferably, in the above establishment method, the step S203 specifically comprises: the WDS-AP stores the address information of the WDS-Repeater; the WDS-Repeater performs a self-configuration according to the channel information, the encryption mode, the cipher key information and the address information of the WDS-AP, and the WDS link is successfully established.

In the present embodiment, after obtaining the link parameters such as the WDS link channel, mac address, channel encryption mode, the cipher key and so on, the WDS-AP stores the address information of the opposite end, i.e. the WDS-Repeater. The WDS-Repeater performs the self-configuration according to the channel information, the encryption mode, the cipher key information, the address information of the WDS-AP and the capability information, and keeps in line with the cipher key and the SSID title of the WDS-AP so as to facilitate the wireless roaming of the wireless site, and the WDS link is successfully established. In such a way, the WDS link parameters are automatically configured, without the necessary for a user to manually perform the configuration, so as to simplify the user's operation procedure of the WDS link.

Preferably, in the above establishment method, in the step S202, the process of obtaining the WDS channel information specifically comprises: the WDS-Repeater transmits an exploration broadcast (wds_develop_request) message, wherein the wds_develop_request message comprises the capability information of the repeater; if the WDS-AP receives the wds_develop_request message within a first allowed time (allow_link_time, the time for which the link is allowed), the WDS-AP, transmits an exploration response (wds_develop_response) message, wherein the wds_develop_response includes the channel information.

In the present embodiment, the WDS-Repeater, after the wdspeer key on the present end is pressed down, initiatively starts, in the form of transmitting the wds_develop_request broadcast message, the scanning of individual channels to search nearby for determining whether there exists a WDS-AP which can be linked, that is, the WDS-AP of which the wdspeer is pressed down. During the initiative scanning, the WDS-Repeater packages some fundamental information of its own end into the wds_develop_request broadcast message, with the packaged information mainly comprising the capability, the mac address, the supported rate and etc. of the WDS-Repeater, wherein the capability mainly comprises a device type indication of its own end (i.e. a WDS-AP or a WDS-Repeater), an indication indicating whether encryption is needed, and usage indication of a short preamble. Genearlly, the allow_link_time is configured to be 2 minutes, that is, the WDS-AP allows in 2 minutes to process the interactive message for establishing the WDS link and to establish the WDS link. The WDS-AP, if receiving a wds_develop_request broadcast message of any WDS-Repeater in 2 minutes, stores the WDS-Repeater fundamental information packaged in the wds_develop_request broadcast message and initiatively starts the scanning of the individual channels, to obtain the channel and then transmit the wds_develop_response message to the WDS-Repeater, so as to attempt to establish the WDS link with the WDS-Repeater, wherein the wds_develop_response message is packaged with some fundamental information of the WDS-AP, primarily comprising the capability, the channel, the supported rate and so on of the WDS-AP, which represents that the WDS-AP is under the status of allowing the WDS link to be established. In the present embodiment, the WDS-Repeater initiatively transmits a wds_develop_request message. The WDS-AP, if receiving the broadcast message in 2 minutes, stores the information of the WDS-Repeater and transmits a wds_develop_response message in response to the broadcast message, so as to inform its own information including the channel of the WDS-AP to the WDS-Repeater. Since the WDS-AP is found by the WDS-Repeater, the channel in the wds_develop_response message of the WDS-AP is the channel. In addition, the limitation on the allow_link_time is equivalent to a limitation on a hostile capture, that is, only if an attacker makes an attack within the allow_link_time after the wdspeer key is pressed down, it can produce disadvantageous effects on the WDS link establishment. As a result, with the combination of the configuration of the allow_link_time and the start-up manner of the user pressing a key, it is helpful to reduce the safety troubles produced by the hostile capture of the interactive messages, effectively prevent the passive attack of an attacker, and improve the safety of the WDS link.

Preferably, in the above establishment method, in the step S202, the process of obtaining the encryption mode and the cipher key information specifically comprises: the WDS-Repeater transmits a link request (wds_link_request) message to the WDS-AP by using the channel; the WDS-AP, if receiving the wds_link_request message within the allow_link_time, compares the number of the WDS links which have been established with a maximum value of allowed links (max_wds_downlink_number); if the number of the WDS links which have been established is less than the max_wds_downlink_number, the WDS-AP transmits a link success (wds_link_response) message which comprises the encryption mode and the cipher key information; the WDS-Repeater receives the wds_link_response message and transmits an authentication request (wds_auth_request) message according to the encryption information; the WDS_AP, if receiving the wds_auth_request message in a second allowed time (LINK_TIME_performs authentication on the WDS-Repeater; and if the authentication is successful, the WDS-AP transmits an authentication success (wds_auth_response) message.

In the present embodiment, after obtaining the channel information from the wds_develop_response message of the WDS_AP, the WDS-Repeater transmits the wds_link_request message to the WDS-AP by using the channel, so as to request for other information of the WDS-AP; the WDS-AP, if receiving the wds_link_request message in the allow_link_time, compares the number of the WDS links which have been established with the max_wds_downlink_number, that is, it examines whether the wireless bandwidth resources have been used up and whether it is allowed to establish one more WDS link, and then the WDS-Repeater and the WDS-AP establish a WDS link according to the comparison result, wherein the max_wds_downlink_number is determined by the limited wireless bandwidth, that is, for each WDS-AP, it is allowed to establish the WDS links of max_wds_downlink_number at the most. The failure of the WDS link establishment due to insufficient wireless bandwidth is avoided, which improves the success rate of the WDS link establishment.

If the number of the WDS links which have been established is less than the max_wds_downlink_number (that is, the wireless bandwidth resources have not been used up), it is allowed to establish a new WDS link, therefore the WDS-AP transmits a wds_link_response message in which the relevant information such as SSID (Service Set Identifier) title, encryption mode, encrypt cipher key, link status code of establishing the WDS link are packaged, wherein the link status code indicates the link status corresponding to the message, if the link status code is "0", it represents the link is successful, while if the link status code is other value, it represents that the link is failed, with the specific value of the link status code indicating the failure reason. The WDS-Repeater obtains the encryption information of the WDS-AP through the wds_link_response message, stores the encryption information, generates, according to the original encryption information of the WDS-AP, the derivative encryption information of the WDS-Repeater, and then packages the derivative encryption information into the wds_auth_request message to transmit to the WDS-AP for initiating an authentication request. The WDS-AP, if receiving the wds_auth_request message within the LINK_TIME_OUT, performs authentication on the WDS-Repeater, wherein the LINK_TIME_OUT is generally set to a time value with the unit of millisecond (ms). If the authentication is successful, the WDS-AP transmits a wds_auth_response message. In the present embodiment, the cipher key is transmitted to the WDS-Repeater through the interaction of the wds_link_response message, achieving the automatic cipher key learning function of the WDS-Repeater, such that it is unnecessary for the user to manually input the information of the encryption mode and the encrypt cipher key of the WDS-AP on the WDS-Repeater, and the procedure of the WDS link establishment is more convenient.

Preferably, in the above establishment method, in the step S202, the process of obtaining the address information of the opposite end specifically comprises: the WDS-Repeater receives the wds_auth_response message, and transmits an add request (wds_add_request) message; the WDS-AP, if judging that the wds_add_request message is received within a third allowed time (ADD_TIME_OUT), transmits an add success (wds_add_response) message which includes the address information of the WDS-AP.

In the present embodiment, if the identity of the WDS-Repeater is authenticated by the WDS-AP, the WDS-AP transmits a wds_auth_response message, and prepares to establish the WDS link with the WDS-Repeater, wherein the wds_auth_response message carries an authentication status code which indicates the authentication status corresponding to the message. If the authentication status code is "0", it represents that the authentication is successful, while if the authentication status code is other value, it represents that the authentication is failed, with the specific code value of the authentication status code indicating the failure reason. After receiving the wds_auth_response message, the WDS-Repeater packages its own mac address into the wds_add_request message to transmit to the WDS-AP, so as to request for adding in the WDS of the WDS-AP to establish the WDS link. The WDS-AP judges whether the wds_add_request message is received within the ADD_TIME_OUT, wherein the ADD_TIME_OUT is generally set as a time value with the unit of millisecond (ms). Then the WDS-Repeater and the WDS-AP establish the WDS link according to the judgment result. The WDS-AP, if receiving the wds_add_request message within the ADD_TIME_OUT, stores the information, such as the mac address of the WDS-Repeater, obtained from the wds_add_request message, and responds the wds_add_response message which carries the mac address and the adding status code of the WDS-AP. The adding status code indicates the adding status corresponding to the message, wherein if the adding status code is "0", it represents that the adding is successful, while if the adding status code is other value, it represents that the adding is failed, with the specific code value of the adding status code indicating the failure reason. With the present embodiment, it is unnecessary for a user to manually input the information such as the mac address, the operation is more convenient, and the configuration procedure is more intelligent.

Figure 3:
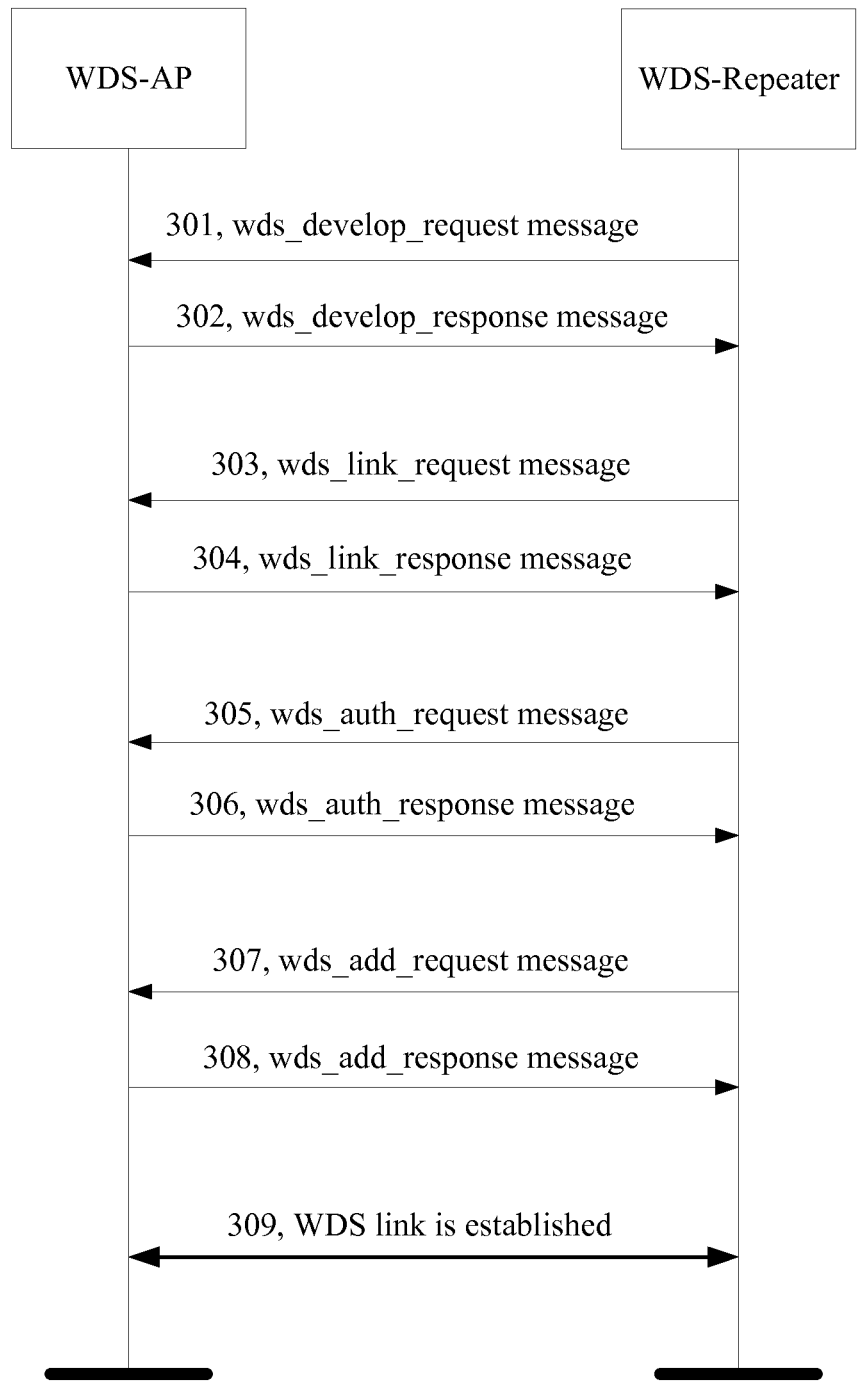
FIG. 3 is a message interacting schematic view of the establishment method according to another embodiment of the present invention.

FIG. 3 shows a message interacting schematic view of the establishment method according to another embodiment of the present invention, wherein the interacting procedure is as follows:

step 301, the WDS-Repeater transmits an exploration broadcast (wds_develop_request) message to the WDS-AP;

step 302, the WDS-AP scans the individual channels to select a channel and transmits an exploration response (wds_develop_response) message to the WDS-repeater;

step 303, the WDS-repeater transmits a link request (wds_link_request) message to the WDS-AP;

step 304, the WDS-AP transmits a link success (wds_link_response) message to the WDS-repeater;

step 305, the WDS-repeater transmits an authentication request (wds_auth_request) message to the WDS-AP;

step 306, the WDS-AP transmits an authentication success (wds_auth_response) message to the WDS-repeater;

step 307, the WDS-repeater transmits an add request (wds_add_request) message to the WDS-AP;

step 308, the WDS-AP transmits an add success (wds_add_response) message to the WDS-repeater;

step 309, the WDS link between the WDS-repeater and the WDS-AP is successfully established.

Preferably, in the above establishment method, the step S202 specifically comprises: the WDS-AP, if not receiving the wds_add_request message within the ADD_TIME_OUT, transmits an add failing message; it is detected whether the allow_link_time expires; according to the detection result, the WDS-repeater and the WDS-AP re-obtain the channel information, channel encryption mode, cipher key information, and address information of the opposite end about the WDS link.

In the present embodiment, if the WDS-AP does not receive the wds_add_request message within the ADD_TIME_OUT, the WDS-link is failed. The WDS-AP transmits an add failing message which carries a failure status code; it is detected whether the allow_link_time expires; and according to the detection result, the WDS-Repeater and the WDS-AP re-obtain the channel information, the channel encryption mode, the cipher key information and the address information of the opposite end of the WDS link. In the present embodiment, the WDS link is failed since the WDS-AP does not receive the wds_add_request message within the ADD_TIME_OUT, however, different operations are adopted according to whether the allow_link_time expires, which effectively prevents the passive attack of an attacker and improves the safety of the WDS link.

Preferably, in the above establishment method, the step S202 specifically comprises: if the authentication is failed, the WDS-AP transmits an authentication failing message; it is detected whether the allow_link_time expires; and according to the detection result, the WDS-Repeater and the WDS-AP re-obtain the channel information, the channel encryption mode, the cipher key information and the address information of the opposite end of the WDS link.

In the present embodiment, if the identity of the WDS-Repeater is not authenticated by the WDS-AP, the WDS-AP deletes the originally stored fundamental information of the WDS-Repeater, and responses an authentication failing message which carries a failure status code; it is detected whether the allow_link_time expires; and then according to the detection result, the WDS-Repeater and the WDS-AP re-obtain the channel information, the channel encryption mode, the cipher key information and the address information of the opposite end of the WDS link. In the present embodiment, the WDS link is failed since the identity of the WDS-Repeater is not authenticated by the WDS-AP, however, different operations are adopted according to whether the allow_link_time expires, which effectively prevents the passive attack of an attacker and improves the safety of the WDS link.

Preferably, in the above establishment method, the step S202 specifically comprises: the WDS-AP, if not receiving a wds_auth_request message within the LINK_TIME_OUT, detects whether the allow_link_time expires. The WDS-Repeater and the WDS-AP re-obtain the channel information, the channel encryption mode, the cipher key information and the address information of the opposite end of the WDS link according to the detection result.

In the present embodiment, the WDS-AP, if not receiving a wds_auth_request message within the LINK_TIME_OUT, detects whether the allow_link_time expires. The WDS-Repeater and the WDS-AP re-obtain the channel information, the channel encryption mode, the cipher key information and the address information of the opposite end of the WDS link according to the detection result. In the present embodiment, the WDS link is failed since the WDS-AP does not receive a wds_auth_request message within the LINK_TIME_OUT, however, different operations are adopted according to whether the allow_link_time expires, which effectively prevents the passive attack of an attacker and improves the safety of the WDS link.

Preferably, in the above establishment method, the step S202 specifically comprises: if the number of the WDS links which have been established is not less than the max_wds_downlink_number, the WDS-AP transmits a link failing message; it is detected whether the allow_link_time expires; and the WDS-Repeater and the WDS-AP re-obtain the channel information, channel encryption mode, cipher key information, and address information of the opposite end about the link between the access point and the repeater according to the detection result.

In the present embodiment, the number of the WDS links which have been established is not less than the max_wds_downlink_number (that is, the wireless bandwidth resources have been used up and it is not allowed to establish one more WDS-Link), the WDS-AP transmits a link failing message; it is detected whether the allow_link_time expires; and the WDS-Repeater and the WDS-AP re-obtain the channel information, channel encryption mode, cipher key information, and address information of the opposite end about the link between the access point and the repeater according to the detection result. In the present embodiment, the WDS link is failed since the number of the WDS links which have been established is not less than the max_wds_downlink_number, however, different operations are adopted according to whether the allow_link_time expires, which effectively prevents the passive attack of an attacker and improves the safety of the WDS link.

Preferably, in the above establishment method, the step that the repeater and the access point re-obtain, according to the detection result, the channel information, channel encryption mode, cipher key information, and address information of the opposite end about the link between the access point and the repeater specifically comprises: if the allow_link_time does not expire, the WDS-AP and the WDS-Repeater re-transmit the interactive message to each other, and re-obtain the channel information, channel encryption mode, cipher key information, and address information of the opposite end about the link between the access point and the repeater from the interactive message.

In the present embodiment, the result of detecting whether the allow_link_time expires is negative (that is, the allow_link_time does not expire), the WDS-Repeater re-scans the channels to update the channel, and then the WDS-Repeater and the WDS-AP establish a WDS link by using the updated channel. Since the allow_link_time has not expired yet, it is deemed that the safety of re-initiating the WDS link at this time is still guaranteed, therefore the interactive message is re-transmitted to each other, so as to obtain the relevant information to establish the WDS link.

Preferably, in the above establishment method, the step that the repeater and the access point re-obtain, according to the detection result, the channel information, the channel encryption mode, the cipher key information and the address information of the opposite end about the link between the access point and the repeater specifically comprises: if the allow_link_time expires, it waits for the restart of the WDS-AP and the WDS-Repeater; the WDS-AP and the WDS-Repeater transmit, after the restart, the interactive message to each other and obtain the channel information, the channel encryption mode, the cipher key information and the address information of the opposite end of the WDS link from the interactive message.

In the present embodiment, the result of detecting whether the allow_link_time expires is positive (that is, the allow_link_time expires), it waits for the restart of the WDS-AP and the WDS-Repeater, a WDS-Link is re-established after the restart. Since the allow_link_time has expired, it is deemed that the safety of re-performing the WDS link at this time is relatively low and it is very possible to be attacked with hostility, therefore it does not initiate to re-establish the WDS link but waits for the restart of the WDS-AP and the WDS-Repeater, so as to restart the timing, and re-establish the WDS link within the allow_link_time with the time at which the timing is restarted as the starting point.

Preferably, in the above establishment method, the step S202 specifically comprises: if the WDS-AP does not receive the wds_link_request message within the allow_link_time, it waits for the restart of the WDS-AP and the WDS-Repeater; and the WDS-AP and the WDS-Repeater transmit, after the restart, the interactive message to each other, and re-obtain the channel information, channel encryption mode, cipher key information, and the address information of the opposite end of the WDS link from the interactive message.

In the present embodiment, since the WDS-AP does not receive the wds_link_request message within the allow_link_time, it is deemed that the safety of re-performing the WDS link is relatively low and it is very possible to be attacked with hostility, therefore it does not initiate to re-establish the WDS link but waits for the restart of the WDS-AP and the WDS-Repeater, so as to restart the timing, and re-establish the WDS link within the allow_link_time with the time at which the timing is restarted as the starting point.

Preferably, in the above establishment method, the step S202 specifically comprises: if the WDS-AP does not receive the wds_develop_request message within the allow_link_time, it waits for the restart of the WDS-AP and the WDS-Repeater; and the WDS-AP and the WDS-Repeater transmit, after the restart, the interactive message to each other, and re-obtain the channel information, channel encryption mode, cipher key information, and the address information of the opposite end of the WDS link from the interactive message.

In the present embodiment, since the WDS-AP does not receive the wds_develop_request message within the allow_link_time, it is deemed that the safety of re-performing the WDS link at this time is relatively low and it is very possible to be attacked with hostility, therefore it does not initiate to re-establish the WDS link but waits for the restart of the WDS-AP and the WDS-Repeater, so as to restart the timing, and re-establish the WDS link within the allow_link_time with the time at which the timing is restarted as the starting point.

Figure 4:
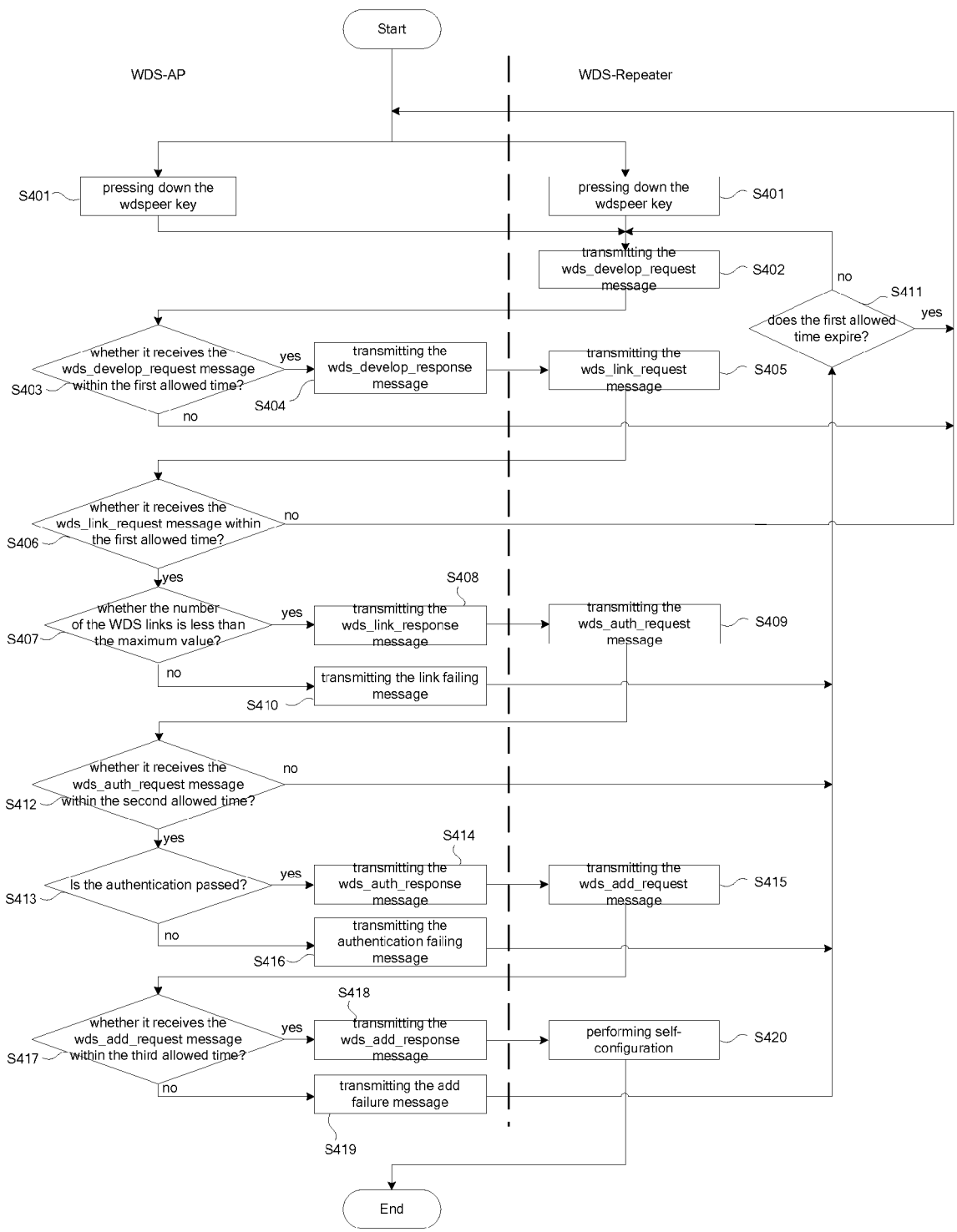
FIG. 4 is a flow chart of the establishment method according to another embodiment of the present invention.

FIG. 4 shows the flowchart of the establishment method according to another embodiment of the present invention, and the method comprises the steps as follows:

step S401, the wdspeer keys of the WDS-AP and the WDS-Repeater are pressed down;

step S402, the WDS-Repeater transmits a wds_develop_request message;

step S403, the WDS-AP judges whether it receives the wds_develop_request message within the first allowed time, wherein if not, it turns to the step S401;

step S404, the WDS-AP transmits a wds_develop_response message;

step S405, the WDS-Repeater transmits a wds_link_request message;

step S406, the WDS-AP judges whether it receives the wds_link_request message within the first allowed time, wherein if not, it turns to the step S401;

step S407, the WDS-AP judges whether the number of the WDS links which have been established is less than the maximum value of the number of the links which are allowed to be established, wherein if it is not less than the maximum value of the number of the links which are allowed to be established, it turns to the step S410;

step S408, the WDS-AP transmits a wds_link_response message;

step S409, the WDS-Repeater transmits an wds_auth_request message, and turns to the step S412;

step S410, the WDS-AP transmits a link failing message;

step S411, it is judged whether the first allowed time expires, wherein if it expires, it turns to the step S401, and if it does not expire, it turns to the step S402;

step S412, the WDS-AP judges whether it receives the wds_auth_request message within the second allowed time, wherein if not, it turns to the step S411;

step S413, the WDS-AP judges whether the authentication on the WDS-Repeater is passed, wherein if it is not passed, it turns to the step S416;

step S414, the WDS-AP transmits a wds_auth_response message;

step S415, the WDS-Repeater transmits a wds_add_request message and it turns to the step S417;

step S416, the WDS-AP transmits an authentication failing message and it turns to the step S411;

step S417, the WDS-AP judges whether it receives the wds_add_request message within the third allowed time, wherein if not, it turns to the step S419;

step S418, the WDS-AP transmits a wds_add_response message;

step S419, the WDS-AP transmits an add failing message, and it turns to the step S411;

step S420, the WDS-Repeater performs self-configuration, and so far, the establishment of the WDS link is finished.

Figure 5:
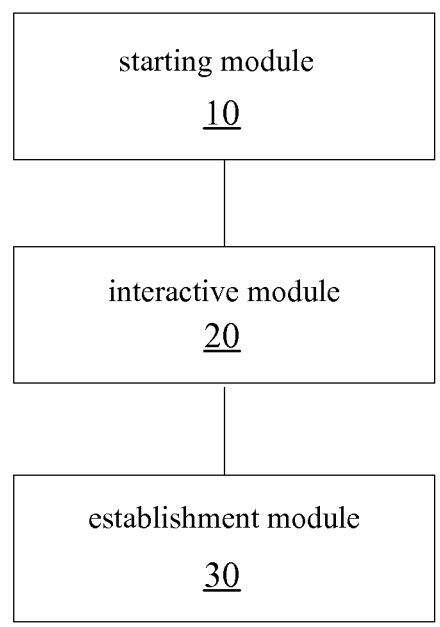
FIG. 5 is a flow chart of the establishment method according to still another embodiment of the present invention.

FIG. 5 shows the structural view of the establishment device according to another embodiment of the present invention, and the device comprises:

a starting module 10, configured to start the WDS-AP and the WDS-Repeater;

an interactive module 20, configured to transmit an interactive message mutually, and obtain the channel information, the channel encryption mode, the cipher key information, and the address information of the opposite end of the WDS from the interactive message;

an establishment module 30, configured to establish the WDS link according to the channel information, the channel encryption mode, the cipher key information, and the address information of the opposite end.

In the present embodiment, firstly, the starting module 10 is used to complete the start of the WDS-AP and the WDS-Repeater. Then, the interactive module 20 is used to transmit an interactive message mutually and obtain the channel information, the channel encryption mode, the cipher key information, and the address information of the opposite end of the WDS from the interactive message. Lastly, the establishment module 30 is used to establish the WDS link according to the channel information, the channel encryption mode, the cipher key information, and the address information of the opposite end, such that it can overcome the problem of the WDS link establishment method in the related art, that is, it needs a user's manual input to determine the link parameters of the WDS link establishment, such as channel, mac address, channel encryption mode, cipher key and so on, which causes the procedure of the link establishment is relatively troublesome, and furthermore it can achieve the automatic optimal configurations on the link parameters such as the WDS link channel, mac address, channel encryption mode, cipher key and so on, such that the user can operate more conveniently and quickly, and the quality and the rate of the link are increased.

On the other hand, in the embodiment of the present invention, it also provides an establishment device of the WDS link, wherein the WDS-AP comprises a wdspeer key, and the establishment device comprises:

a starting module, configured to start the WDS-AP by pressing down the wdspeer key, and start the WDS-Repeater;

an interactive module, configured to transmit an interactive message mutually, and obtain the channel information, the channel encryption mode, the cipher key information, and the address information of the opposite end of the WDS link from the interactive message;

an establishment module, configured to establish the WDS link according to the channel information, the channel encryption mode, the cipher key information, and the address information of the opposite end.

In the present embodiment, the WDS-AP comprises a wdspeer key, such that the user merely needs to press down the wdspeer key to start the WDS-AP, and then the WDS-Repeater is started. Afterwards, the WDS-AP and the WDS-Repeater can obtain, by transmitting the interactive message to each other, the channel information, the channel encryption mode, the cipher key information, and the address information of the opposite end of the WDS link from the interactive message, so as to automatically establish the WDS link, thereby, it overcomes the problem of the establishment method for a WDS link in the related art, that is, it needs the user's manual input to determine the link parameters of the WDS link establishment, such as channel, mac address, channel encryption mode, cipher key and so on, which causes the procedure of the link establishment is relatively troublesome. Furthermore, it achieves the automatic optimal configurations on the link parameters such as the WDS link channel, mac address, the channel encryption mode, the cipher key and so on, such that the operation of the user is more convenient and quickly, and the quality and the rate of the link are increased.

On the other hand, in the embodiment of the present invention, it also provides an establishment device of the WDS link, wherein the WDS-Repeater comprises a wdspeer key, and the establishment device comprises:

a starting module, configured to start the WDS-Repeater by pressing down the wdspeer key, and start the WDS-AP;

an interactive module, configured to transmit an interactive message mutually, and obtain the channel information, the channel encryption mode, the cipher key information, and the address information of the opposite end of the WDS link from the interactive message;

an establishment module, configured to establish the WDS link according to the channel information, the encryption mode, the cipher key information, and the address information of the opposite end.

In the present embodiment, the WDS-Repeater comprises a wdspeer key, such that the user merely needs to presses down the wdspeer key to start the WDS-Repeater, and then the WDS-AP is started. Afterwards, the WDS-AP and the WDS-Repeater can obtain, by transmitting the interactive message to each other, the channel information, the channel encryption mode, the cipher key information, and the address information of the opposite end of the WDS link from the interactive message, so as to automatically establish the WDS link, thereby, it overcomes the problem of the establishment method for a WDS link in the related art, that is, it needs the user's manual input to determine the link parameters of the WDS link establishment, such as channel, mac address, channel encryption mode, cipher key and so on, which causes the procedure of the link establishment is relatively troublesome. Furthermore, it achieves the automatic optimal configurations on the link parameters such as the WDS link channel, mac address, the channel encryption mode, the cipher key and so on, such that the operation of the user is more convenient and quickly, and the quality and the rate of the link are increased.

It is concluded from the above description that the above embodiments of the present invention achieve the automatic optimal configurations on the link parameters such as the WDS link channel, mac address, the channel encryption mode, the cipher key and so on, such that the operation of the user is more convenient, and the quality and the rate of the link are increased.

Obviously, those skilled in the art should appreciate that the individual modules and steps of the present invention mentioned above can be realized by a general computing device. They can be integrated to a single computing device or distributed over the network composed of plural computing devices. Optionally, they can be realized by program code executable by a computing device, therefore they can be stored in a storing device to be executed by a computing device, or they can be respectively manufactured into various integrated circuit modules, or plural modules or steps among them can be manufactured into a single integrated circuit module. In such a way, the present invention is not limited to any particular combination of hardware and software.

The above description is just preferable embodiments of the present invention but not used for limiting the present invention. For those skilled in the art, various changes and modifications can be made to the present invention. Without departing the spirit and the principle of the present invention, any amendment, equivalent substitution and improvement should be concluded in the protection scope of the present invention.

What is claimed is:

1. An establishment method for a link between an access point and a repeater in a wireless distribution system, characterized by, comprising the following steps:
   starting the access point and the repeater in the wireless distribution system;
   the access point and the repeater transmitting an interactive message to each other, and obtaining channel information, channel encryption mode, cipher key information, and address information of an opposite end about the link between the access point and the repeater from the interactive message;
   the access point and the repeater establishing the link between the access point and the repeater according to the channel information, the channel encryption mode, the cipher key information, and the address information of the opposite end.

2. The establishment method according to claim 1, characterized in that the step of starting the access point and the repeater in the wireless distribution system comprises:
   pressing down a wireless distribution system peer key of the access point and the repeater.

3. The establishment method according to claim 2, characterized in that the step of the access point and the repeater establishing the link between the access point and the repeater according to the channel information, the channel encryption mode, the cipher key information, and the address information of the opposite end comprises:
   the access point storing the address information of the repeater;
   the repeater performing a self-configuration according to the channel information, the channel encryption mode, the cipher key information and the address information of the access point, and the link of the wireless distribution system being successfully established.

4. The establishment method according to claim 3, characterized in that the step of the access point and the repeater transmitting the interactive message to each other, and obtaining the channel information about the link between the access point and the repeater from the interactive message comprises:
   the repeater transmitting an exploration broadcast message, wherein the exploration broadcast message comprises capability information of the repeater; and
   the access point transmitting an exploration response message if the access point receives the exploration broadcast message within a first allowed time, wherein the exploration response message comprises the channel information.

5. The establishment method according to claim 4, characterized in that the step of the access point and the repeater transmitting the interactive message to each other, and obtaining the channel encryption mode and the cipher key information from the interactive message comprises:
   the repeater transmitting a link request message to the access point by using channel;
   the access point comparing the number of wireless distribution system links which have been established with a maximum value of allowable links if the access point receives the link request message within the first allowed time;
   if the number of the wireless distribution system links which have been established is less than the maximum value of the allowable links, the access point transmitting a link success message, wherein the link success message comprises the channel encryption mode and the cipher key information;
   the repeater receiving the link success message and transmitting an authentication request message according to the encryption information;
   the access point performing authentication on the repeater if the access point receives the authentication request message within a second allowed time; and
   if the authentication is successful, the access point transmitting an authentication success message.

6. The establishment method according to claim 5, characterized in that the step of the access point and the repeater transmitting the interactive message to each other, and obtaining the address information of the opposite end from the interactive message comprises:
- the repeater receiving the authentication success message and transmitting an add request message, wherein the add request message comprises the address information of the repeater; and
- the access point transmitting an add success message if the access point receives the add request message within a third allowed time, wherein the add request message comprises the address information of the access point.

7. The establishment method according to claim 6, characterized in that the step of the access point and the repeater transmitting the interactive message to each other, and obtaining the channel information, the channel encryption mode, the cipher key information, and the address information of the opposite end about the link between the access point and the repeater from the interactive message comprises:
- the access point transmitting an add failing message if the access point does not receive the add request message within the third allowed time;
- detecting whether the first allowed time expires; and
- according to a detection result, the repeater and the access point re-obtaining the channel information, the channel encryption mode, the cipher key information, and the address information of the opposite end about the link between the access point and the repeater.

8. The establishment method according to claim 5, characterized in that the step of the access point and the repeater transmitting the interactive message to each other, and obtaining the channel information, the channel encryption mode, the cipher key information, and the address information of the opposite end about the link between the access point and the repeater from the interactive message comprises:
- if the authentication is failed, the access point transmitting an authentication failing message;
- detecting whether the first allowed time expires; and
- according to a detection result, the repeater and the access point re-obtaining the channel information, the channel encryption mode, the cipher key information, and the address information of the opposite end about the link between the access point and the repeater.

9. The establishment method according to claim 5, characterized in that the step of the access point and the repeater transmitting the interactive message to each other, and obtaining the channel information, the channel encryption mode, the cipher key information, and the address information of the opposite end about the link between the access point and the repeater from the interactive message comprises:
- the access point detecting whether the first allowed time expires if the access point does not receive the authentication request message within the second allowed time; and
- according to a detection result, the repeater and the access point re-obtaining the channel information, the channel encryption mode, the cipher key information, and the address information of the opposite end about the link between the access point and the repeater.

10. The establishment method according to claim 5, characterized in that the step of the repeater and the access point transmitting the interactive message to each other, and obtaining the channel information, the channel encryption mode, the cipher key information, and the address information of the opposite end about the link between the access point and the repeater from the interactive message comprises:
- if the number of the wireless distribution system links which have been established is not less than the maximum value of the allowable links, the access point transmitting a link failing message;
- detecting whether the first allowed time expires; and
- according to a detection result, the repeater and the access point re-obtaining the channel information, the channel encryption mode, the cipher key information, and the address information of the opposite end about the link between the access point and the repeater.

11. The establishment method according to claim 7, characterized in that the step of the repeater and the access point re-obtaining the channel information, the channel encryption mode, the cipher key information, and address information of the opposite end about the link between the access point and the repeater according to the detection result comprises:
- if the first allowed time does not expire, the access point and the repeater re-transmitting the interactive message to each other, and re-obtaining the channel information, the channel encryption mode, the cipher key information, and the address information of the opposite end about the link between the access point and the repeater from the interactive message.

12. The establishment method according to claim 7, characterized in that the step of the repeater and the access point re-obtaining the channel information, the channel encryption mode, the cipher key information, and the address information of the opposite end about the link between the access point and the repeater according to the detection result comprises:
- if the first allowed time expires, waiting for a restart of the access point and the repeater;
- the access point and the repeater, after restarting, transmitting the interactive message to each other and obtaining the channel information, the channel encryption mode, the cipher key information, and the address information of the opposite end about the link between the access point and the repeater from the interactive message.

13. The establishment method according to claim 5, characterized in that the step of the access point and the repeater transmitting the interactive message to each other and obtaining the channel information, the channel encryption mode, the cipher key information, and the address information of the opposite end about the link between the access point and the repeater from the interactive message comprises:
- the access point waiting for a restart of the access point and the repeater if the access point does not receive the link request message within the first allowed time; and
- the access point and the repeater, after restarting, transmitting the interactive message to each other and re-obtaining the channel information, the channel encryption mode, the cipher key information, and the address information of the opposite end about the link between the access point and the repeater from the interactive message.

14. The establishment method according to claim 4, characterized in that the step of the access point and the repeater transmitting the interactive message to each other and obtaining the channel information, the channel encryption mode, the cipher key information, and the address information of the opposite end about the link between the access point and the repeater from the interactive message comprises:
- the access point waiting for a restart of the access point and the repeater if the access point does not receive the exploration broadcast message within the first allowed time; and the access point and the repeater, after restarting, transmitting the interactive message to each other and re-obtaining the channel information, the channel encryption mode, the cipher key information, and the address information of the opposite end about the link between the access point and the repeater from the interactive message.

15. An establishment device for a link between an access point and a repeater in a wireless distribution system, characterized by, comprising:

a starting module, configured to start the access point and the repeater in the wireless distribution system;

an interactive module, configured to transmit an interactive message mutually and obtain channel information, channel encryption mode, cipher key information, and address information of an opposite end about the link between the access point and the repeater from the interactive message; and an establishment module, configured to establish the link between the access point and the repeater according to the channel information, the channel encryption mode, the cipher key information, and the address information of the opposite end.

16. The establishment device according to claim 15, characterized in that the access point in the wireless distribution system comprises a wireless distribution system peer key, and the starting module, configured to start the access point by pressing down the wireless distribution system peer key, and start the repeater in the wireless distribution system.

17. The establishment device according to claim 15, characterized in that the repeater of the wireless distribution system comprises a wireless distribution system peer key and the starting module, configured to start the repeater by pressing down the wireless distribution system peer key, and start the access point in the wireless distribution system.

18. The establishment method according to claim 8, characterized in that the step of the repeater and the access point re-obtaining the channel information, the channel encryption mode, the cipher key information, and address information of the opposite end about the link between the access point and the repeater according to the detection result comprises:

if the first allowed time does not expire, the access point and the repeater re-transmitting the interactive message to each other, and re-obtaining the channel information, the channel encryption mode, the cipher key information, and the address information of the opposite end about the link between the access point and the repeater from the interactive message.

19. The establishment method according to claim 9, characterized in that the step of the repeater and the access point re-obtaining the channel information, the channel encryption mode, the cipher key information, and address information of the opposite end about the link between the access point and the repeater according to the detection result comprises:

if the first allowed time does not expire, the access point and the repeater re-transmitting the interactive message to each other, and re-obtaining the channel information, the channel encryption mode, the cipher key information, and the address information of the opposite end about the link between the access point and the repeater from the interactive message.

20. The establishment method according to claim 10, characterized in that the step of the repeater and the access point re-obtaining the channel information, the channel encryption mode, the cipher key information, and address information of the opposite end about the link between the access point and the repeater according to the detection result comprises:

if the first allowed time does not expire, the access point and the repeater re-transmitting the interactive message to each other, and re-obtaining the channel information, the channel encryption mode, the cipher key information, and the address information of the opposite end about the link between the access point and the repeater from the interactive message.

21. The establishment method according to claim 8, characterized in that the step of the repeater and the access point re-obtaining the channel information, the channel encryption mode, the cipher key information, and the address information of the opposite end about the link between the access point and the repeater according to the detection result comprises:

if the first allowed time expires, waiting for a restart of the access point and the repeater;

the access point and the repeater, after restarting, transmitting the interactive message to each other and obtaining the channel information, the channel encryption mode, the cipher key information, and the address information of the opposite end about the link between the access point and the repeater from the interactive message.

22. The establishment method according to claim 9, characterized in that the step of the repeater and the access point re-obtaining the channel information, the channel encryption mode, the cipher key information, and the address information of the opposite end about the link between the access point and the repeater according to the detection result comprises:

if the first allowed time expires, waiting for a restart of the access point and the repeater;

the access point and the repeater, after restarting, transmitting the interactive message to each other and obtaining the channel information, the channel encryption mode, the cipher key information, and the address information of the opposite end about the link between the access point and the repeater from the interactive message.

23. The establishment method according to claim 10, characterized in that the step of the repeater and the access point re-obtaining the channel information, the channel encryption mode, the cipher key information, and the address information of the opposite end about the link between the access point and the repeater according to the detection result comprises:

if the first allowed time expires, waiting for a restart of the access point and the repeater; the access point and the repeater, after restarting, transmitting the interactive message to each other and obtaining the channel information, the channel encryption mode, the cipher key information, and the address information of the opposite end about the link between the access point and the repeater from the interactive message.

* * * * *